(12) United States Patent
Krajenke (10) Patent No.: US 8,328,269 B2
(45) Date of Patent: Dec. 11, 2012

(54) ARTICULATING TRIM CLOSEOUT PANEL FOR OPPOSING HINGED DOORS

(75) Inventor: Gary W. Krajenke, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 13/015,644

(22) Filed: Jan. 28, 2011

(65) Prior Publication Data

US 2012/0193938 A1    Aug. 2, 2012

(51) Int. Cl.
*B60J 5/06* (2006.01)
(52) U.S. Cl. .................. 296/146.9; 296/146.1
(58) Field of Classification Search ............... 296/146.1, 296/147, 146.7, 146.9, 202
See application file for complete search history.

(56) References Cited

U.S. PATENT DOCUMENTS

| | | | | |
|---|---|---|---|---|
| 2,860,911 A | * | 11/1958 | Cotter | 296/202 |
| 5,791,723 A | * | 8/1998 | Bell et al. | 296/155 |
| 6,913,308 B2 | * | 7/2005 | Azzouz et al. | 296/146.1 |
| 7,052,072 B2 | * | 5/2006 | Patberg | 296/146.9 |
| 7,073,294 B2 | * | 7/2006 | Yamaoka et al. | 49/479.1 |
| 7,703,837 B2 | * | 4/2010 | Lichter et al. | 296/155 |
| 7,950,704 B2 | * | 5/2011 | Kovie | 292/336.3 |
| 8,196,992 B2 | * | 6/2012 | Konchan et al. | 296/146.9 |
| 2001/0017006 A1 | * | 8/2001 | Saito | 49/368 |
| 2004/0056509 A1 | * | 3/2004 | Moriyama | 296/146.9 |
| 2008/0122250 A1 | * | 5/2008 | Lichter et al. | 296/146.9 |
| 2009/0072582 A1 | * | 3/2009 | Elliott et al. | 296/146.11 |
| 2010/0156140 A1 | * | 6/2010 | Elliott et al. | 296/146.5 |
| 2012/0019023 A1 | * | 1/2012 | Konchan et al. | 296/146.9 |
| 2012/0153678 A1 | * | 6/2012 | Konchan et al. | 296/202 |

* cited by examiner

*Primary Examiner* — Lori Lyjak
(74) *Attorney, Agent, or Firm* — Quinn Law Group, PLLC (57) ABSTRACT

A vehicle includes a pair of opposing hinged doors. The pair of opposing hinged doors includes a first door and a second door. An articulating trim panel is moveably attached to the second door, and is moveable between a deployed position and a refracted position. When in the deployed position, the articulating trim panel conceals an interior gap between a first interior trim panel of the first door and a second interior trim panel of the second door. When in the refracted position, the articulating trim panel is withdrawn from the interior gap, thereby allowing independent pivotable movement of the first door and the second door relative to each other.

19 Claims, 5 Drawing Sheets

ARTICULATING TRIM CLOSEOUT PANEL FOR OPPOSING HINGED DOORS

TECHNICAL FIELD

The invention generally relates to a pair of opposing hinged doors, and more specifically to an articulating trim panel for concealing an interior gap between interior trim panels of the opposing hinged doors.

BACKGROUND

Opposing-hinged doors on vehicles include a first door and a second door arranged on the same side of the vehicle, longitudinally adjacent to each other, with the first door disposed nearer a first end of the vehicle, e.g., a front end of the vehicle, than the second door. Each of the opposing-hinged doors pivots open in an opposite direction. More specifically, the first door includes a forward edge disposed nearer the first end of the vehicle and a rearward edge disposed nearer a second end of the vehicle, e.g., a rearward end of the vehicle. The first door is hinged along the forward edge of the first door, and pivots open in a first pivot direction such that the rearward edge of the first door swings away from the vehicle when opening the first door and toward the vehicle when closing the first door. The second door also includes a forward edge disposed nearer the first end of the vehicle and a rearward edge disposed nearer the second end of the vehicle. The second door is hinged along the rearward edge of the second door, and pivots in a second pivot direction, which is opposite the first pivot direction, such that the forward edge of the second door swings away from the vehicle when opening the second door and toward the vehicle when closing the second door. Accordingly, the first door and the second door open and close in opposite directions.

Opposing-hinged doors may not include a body pillar disposed between the first door and the second door. When no body pillar exists between the first door and the second door, the first door and the second door are arranged immediately adjacent each other in sealing engagement. Typically, the opposing-hinged doors are arranged such that the more forward door, i.e., the first door, must be opened prior to and in order to open the more rearward door, i.e., the second door. In other words, opening the more rearward second door is dependent upon opening the more forward first door beforehand.

If no body pillar exists between the first door and the second door, then the first door and the second door must be designed to permit uninterrupted pivotal movement therebetween in order to allow for the first door and the second door to be independently openable and/or closeable. Because of the swing path that the first door and the second door follow during pivotable movement, interior trim panels of the first door and the second door must be longitudinally spaced from each other to prevent contacting each other during pivotable movement therebetween. This spacing between the interior trim panels of the first door and the second door define an interior gap therebetween, which is unsightly to consumers.

SUMMARY

A vehicle is provided that includes a body and a pair of opposing hinged doors. The pair of opposing hinged doors is mounted to the body, and includes a first door and a second door. The first door includes a first exterior panel and a first interior trim panel spaced from the first exterior panel. The second door includes a second exterior panel and a second interior trim panel spaced from the second exterior panel. The first door is pivotably moveable relative to the body in a first pivot direction between an open position and a closed position. The second door is pivotably moveable relative to the body in a second pivot direction between an open position and a closed position. The second pivot direction is opposite the first pivot direction. The first interior trim panel and the second interior trim panel define an interior gap therebetween. An articulating trim panel is moveably attached to the second interior trim panel for movement between a deployed position and a retracted position. The articulating trim panel at least partially conceals the interior gap when in the deployed position, and is withdrawn from the interior gap when in the retracted position to allow the pivotable movement of the second door relative to the first door.

A pair of opposing hinged doors for a vehicle is also provided. The pair of opposing hinged doors includes a first door and a second door. The first door includes a first exterior panel and a first interior trim panel spaced from the first exterior panel. The second door includes a second exterior panel and a second interior trim panel spaced from the second exterior panel. The first door is configured for pivotable movement relative to a body of the vehicle in a first pivot direction between an open position and a closed position. The second door is configured for pivotable movement relative to the body in a second pivot direction between an open position and a closed position. The second pivot direction is opposite the first pivot direction. The first interior trim panel and the second interior trim panel define an interior gap therebetween. An articulating trim panel is moveably attached to the second interior trim panel for movement between a deployed position and a retracted position. The articulating trim panel at least partially conceals the interior gap when in the deployed position, and is withdrawn from the interior gap when in the retracted position to allow the pivotable movement of the second door relative to the first door. The articulating trim panel is rotatably moveable about a pivot axis relative to the second interior trim panel. A biasing device is configured for biasing the articulating trim panel into the deployed position. A damper is disposed between the articulating trim panel and the second interior trim panel. The damper is configured for damping movement between the articulating trim panel and the second interior trim panel. The second door includes an actuator that is coupled to the articulating trim panel. The actuator is configured for moving the articulating trim panel between the deployed position and the retracted position. The second door includes a linkage system that interconnects the actuator and the articulating trim panel. The second door includes a seal module that is moveable between a sealing position and a withdrawn position. The seal module is disposed in sealing engagement with the first door and the second door when in the sealing position to seal an exterior gap between the first exterior trim panel and the second exterior trim panel. The seal module is longitudinally spaced from the first door when in the retracted position to allow independent movement of each of the first door and the second door relative to each other. The linkage system pivotably interconnects the seal module and the second door. The linkage system is configured for moving the seal module along an arcuate path. When moving from the sealing position into the withdrawn position, the arcuate path initially directs the seal module away from the first door and the second door, and toward the first interior trim panel and the second interior trim panel, and then directs the seal module along a longitudinal axis away from the first door. When moving from the withdrawn position into the sealing position, the arcuate path initially directs the seal module toward the first door along the longitudinal axis, and then directs the seal module toward the first exterior panel and the second exterior panel. The linkage system includes an articulating trim link that connects the articulating trim panel and the seal module. The articulating trim link is configured for simultaneously moving the articulating trim panel with the seal module.

Accordingly, the articulating trim panel is disposed within and conceals the interior gap between the first interior trim panel and the second interior trim panel to improve the aesthetics of the vehicle when in the deployed position. Once moved into the retracted position, the articulating trim panel is withdrawn from the interior gap to not interfere with pivotable movement of the first door and/or the second door while opening and/or closing the first door and the second door.

The above features and advantages and other features and advantages of the present invention are readily apparent from the following detailed description of the best modes for carrying out the invention when taken in connection with the accompanying drawings.

DETAILED DESCRIPTION

Figure 1:
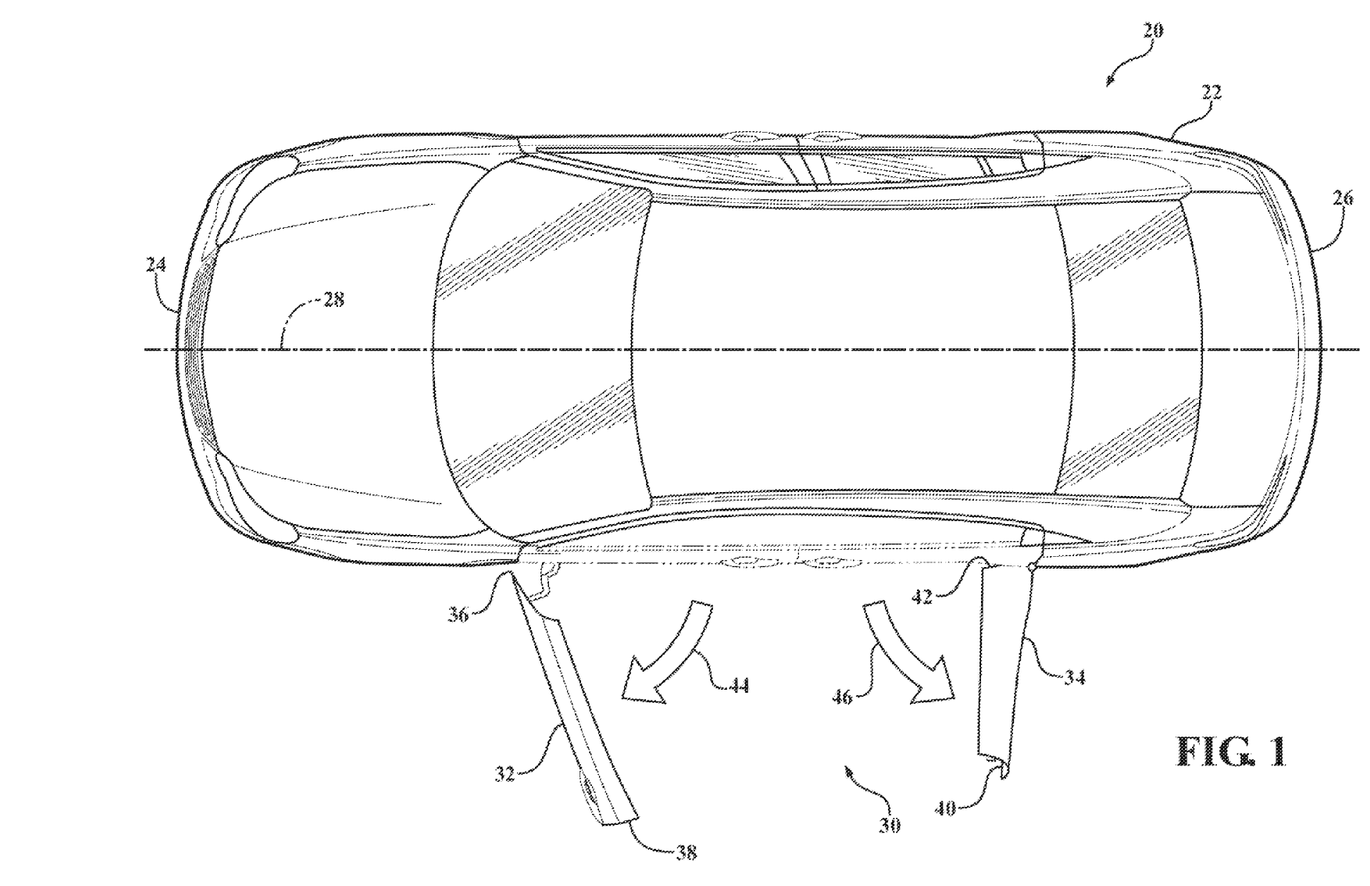
FIG. 1 is a schematic plan view of a vehicle showing a pair of opposing hinged doors in an open position.

Referring to the Figures, wherein like numerals indicate like parts throughout the several views, a vehicle is shown generally at 20. The vehicle 20 may include any style and/or size of vehicle 20 including but not limited to a passenger car, a sport utility vehicle 20 or a van. Referring to FIG. 1, the vehicle 20 includes a body 22. The body 22 may include a frame and any structural support elements attached thereto, as well as the outer sheet metal coverings attached to the frame and/or structural elements of the vehicle 20.

While the present invention is described in detail with respect to automotive applications, those skilled in the art will recognize the broader applicability of the invention. Those having ordinary skill in the art will also recognize that terms such as "above," "below," "upward," "downward," "forward," "rearward," et cetera, are used descriptively of the figures, and do not represent limitations on the scope of the invention, as defined by the appended claims.

The body 22 includes a first end 24 and a second end 26. The second end 26 of the body 22 is disposed opposite the first end 24 along a longitudinal axis 28 of the body 22. As shown, the first end 24 of the vehicle 20 includes a front of the vehicle 20. However, the first end 24 of the vehicle 20 is not limited to the front of the vehicle 20. As shown, the second end 26 includes a back end of the vehicle 20. However, the second end 26 of the vehicle 20 is not limited to the back of the vehicle 20. The longitudinal axis 28 extends between the first end 24 and the second end 26 of the vehicle 20.

The vehicle 20 further includes a pair of opposing hinged doors 30 mounted to the body 22. The pair of opposing hinged doors 30 may include any pair of opposing hinged closure panels, including but not limited to, side occupant doors, rear cargo doors, windows, etc. As shown, the opposing hinged doors 30 are disposed adjacent each other on the same longitudinal side of the body 22, and open in opposite directions, away from each other to provide a continuous, i.e., unobstructed, opening into an interior compartment of the vehicle 20. It should be appreciated that the pair of opposing-hinged doors may be disposed elsewhere on the vehicle 20, for example at the rear end of the vehicle 20.

The pair of opposing hinged doors 30 includes a first door 32 and a second door 34. The first door 32 and the second door 34 are disposed on the same side of the vehicle 20, adjacent each other. As shown, the first door 32 is disposed nearer the first end 24 of the body 22 than the second door 34, and the second door 34 is disposed nearer the second end 26 of the body 22 than the first door 32. However, it should be appreciated that the positions of the first door 32 and the second door 34 relative to the first end 24 and the second end 26 of the vehicle 20 may be reversed from that shown in the Figures.

The first door 32 includes a first edge 36 and a second edge 38. The second edge 38 of the first door 32 is disposed opposite the first edge 36 along the longitudinal axis 28 of the body 22 when the first door 32 is closed. Accordingly, the first edge 36 and the second edge 38 of the first door 32 define a forward edge and a rearward edge of the first door 32 respectively. As shown, the first edge 36 of the first door 32 is disposed nearer the first end 24 of the body 22 than the second edge 38 of the first door 32, and the second edge 38 of the first door 32 is disposed nearer the second end 26 of the body 22 than the first edge 36 of the first door 32. However, it should be appreciated that the positions of the first edge 36 and the second edge 38 of the first door 32 may be reversed from that shown in the Figures.

The second door 34 is pivotably attached to the body 22. The second door 34 includes a first edge 40 and a second edge 42. The first edge 40 of the second door 34 is disposed opposite the second edge 42 along the longitudinal axis 28 of the body 22 when the second door 34 is closed. Accordingly, the first edge 40 and the second edge 42 of the second door 34 define a forward edge and a rearward edge of the second door 34. As shown, the first edge 40 of the second door 34 is disposed nearer the first end 24 of the body 22 than the second edge 42 of the second door 34, and the second edge 42 of the second door 34 is disposed nearer the second end 26 of the body 22 than the first edge 40 of the second door 34. However, it should be appreciated that the positions of the first edge 40 and the second edge 42 of the second door 34 may be reversed from that shown in the Figures.

Figure 2:
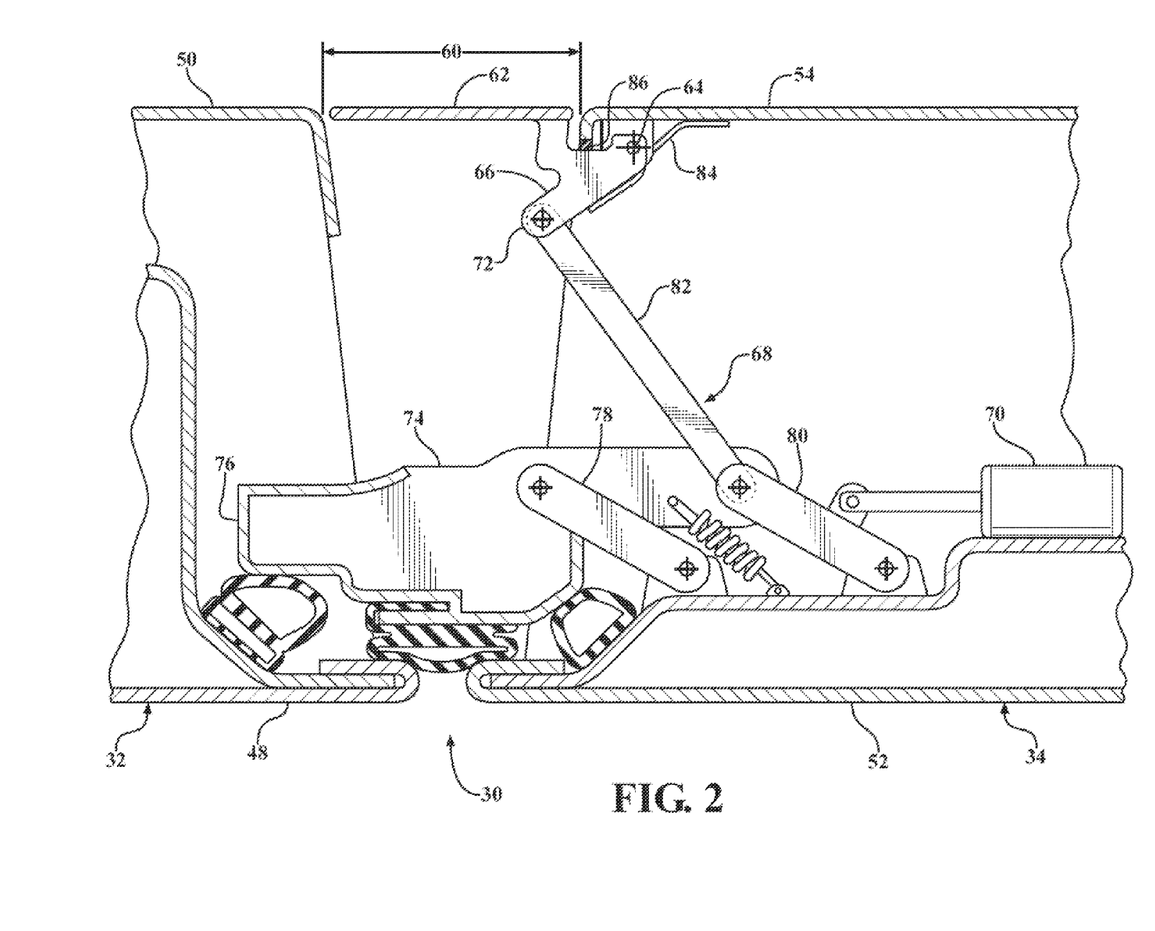
FIG. 2 is a schematic fragmentary cross sectional view of the pair of opposing hinged doors showing an articulating trim panel in a deployed position.
Figure 3:
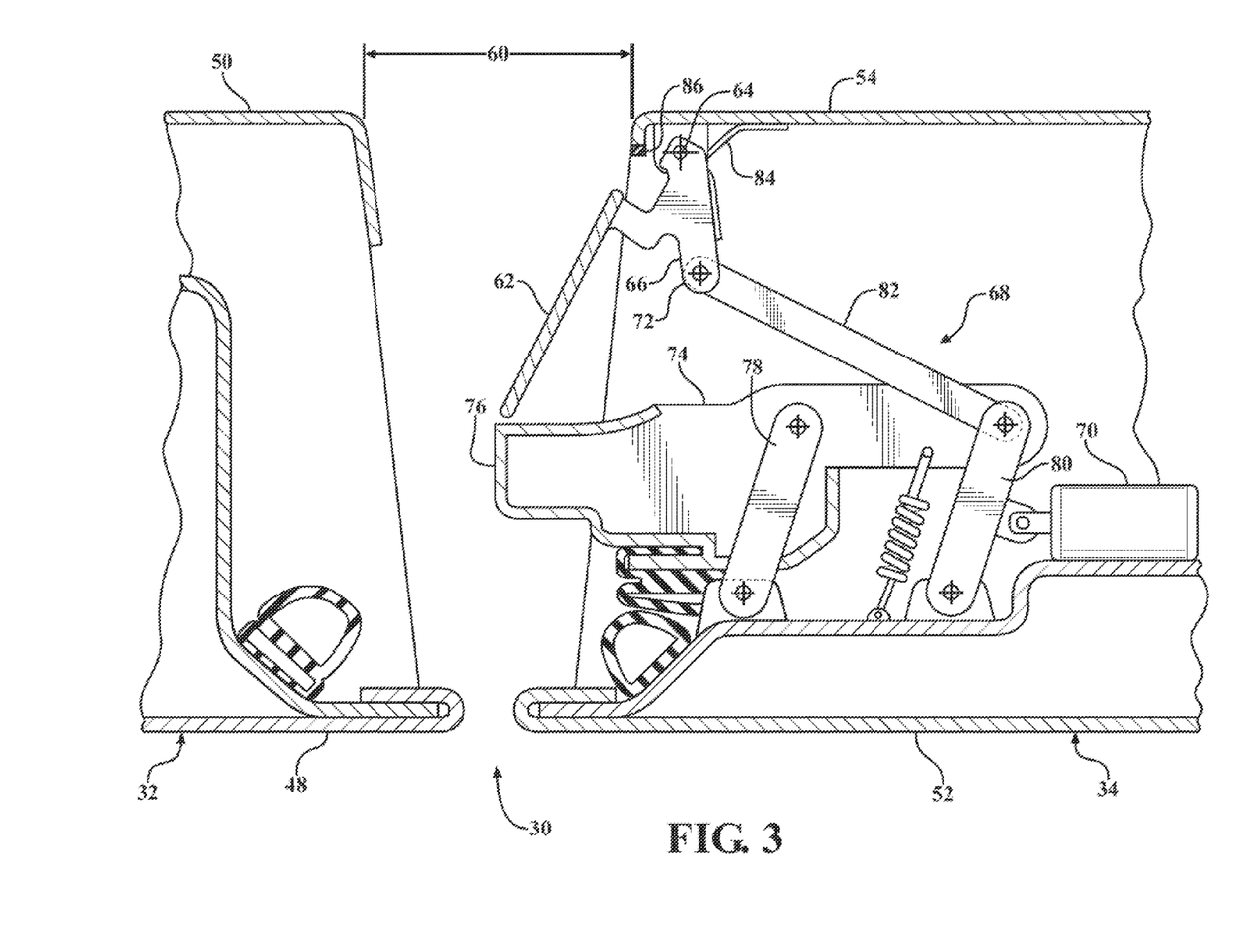
FIG. 3 is a schematic fragmentary cross sectional view of the pair of opposing hinged doors showing the articulating trim panel in a retracted position.

The first door 32 is moveable between an open position, shown in FIG. 1, and a closed position, shown in FIGS. 2 and 3. The first door 32 pivots into the open position in a first pivot direction 44. The second door 34 is moveable between an open position, shown in FIG. 1, and a closed position, shown in FIGS. 2 and 3. The second door 34 pivots open in a second pivot direction 46. The second pivot direction 46 is opposite the first pivot direction 44. As such, the first pivot direction 44 may include one of a counterclockwise direction and a clockwise direction, with the second pivot direction 46 including the other of the counterclockwise direction and the clockwise direction. As shown in FIG. 1, the first pivot direction 44 includes the clockwise direction, and the second pivot direction 46 includes the counterclockwise direction.

The first door 32 and the second door 34 are "opposing hinged doors 30" as the first door 32 and the second door 34 pivot open respectively in opposite directions. The first door 32 and the second door 34 are disposed adjacent each other and in sealing engagement with each other when each of the first door 32 and the second door 34 are in their respective closed positions. The opposing-hinged doors allow for a continuous opening defined by the body 22, with no B-pillar disposed between the first door 32 and the second door 34. The first door 32 and the second door 34 are independently openable and closeable, i.e., may be opened and closed in either order or simultaneously.

Referring to FIGS. 2 and 3, the first door 32 includes a first exterior panel 48 and a first interior trim panel 50. The first interior trim panel 50 is spaced from the first exterior panel 48. Similarly, the second door 34 includes a second exterior panel 52 and a second interior trim panel 54. The second interior trim panel 54 is spaced from the second exterior panel 52. The first door 32 pivots open and closed about a first pivot axis, and the second door 34 pivots open and closed about a second pivot axis. The first pivot axis and the second pivot axis are generally disposed along a plane adjacent the first exterior panel 48 of the first door 32 and the second exterior panel 52 of the second door 34 respectively. Because the first interior trim panel 50 and the second interior trim panel 54 are laterally spaced from their respective pivot axis', the rearward edge of the first interior trim panel 50 swings toward the forward edge of the second exterior panel 52 as the first door 32 opens and closes, and the forward edge of the second interior trim panel 54 swings toward the rearward edge of the first exterior panel 48 as the second door 34 opens and closes. In order to avoid the rearward edge of the first interior trim panel 50 from contacting the forward edge of the second exterior panel 52, and the forward edge of the second interior trim panel 54 from contacting the rearward edge of the first exterior panel 48, the first interior trim panel 50 and the second interior trim panel 54 define an interior gap 60 therebetween, thereby providing sufficient space to prevent the rearward edge of the first interior trim panel 50 from contacting the forward edge of the second exterior panel 52, and the forward edge of the second interior trim panel 54 from contacting the rearward edge of the first exterior panel 48.

In order to conceal the interior gap 60, the second includes an articulating trim panel 62. The articulating trim panel 62 is moveably attached to the second interior trim panel 54. The articulating trim panel 62 is moveable between a deployed position, shown in FIG. 2, and a retracted position, shown in FIG. 3. The articulating trim panel 62 at least partially conceals the interior gap 60 when in the deployed position, and is withdrawn from the interior gap 60 when in the retracted position. When withdrawn from the interior gap 60, the articulating trim panel 62 allows for the pivotable movement of the second door 34 relative to the first door 32.

Figure 4:
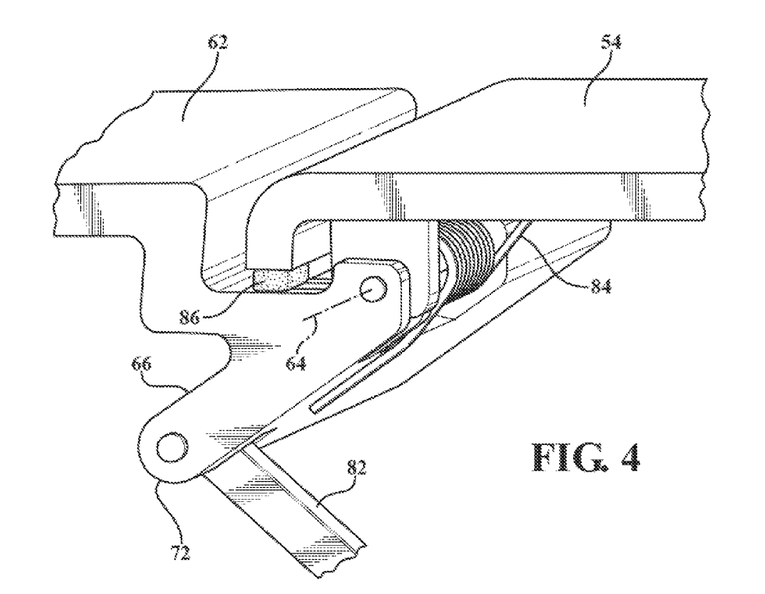
FIG. 4 is an enlarged schematic perspective view of the articulating trim panel.

As shown in FIGS. 2 through 4, the articulating trim panel 62 is rotatably moveable relative to the second interior trim panel 54 about a rotation axis 64. The articulating trim panel 62 includes a lever 66 laterally spaced from and parallel with the rotation axis 64 of the articulating trim panel 62. A linkage system 68 interconnects an actuator 70, described in greater detail below, and the articulating trim panel 62. More specifically, the linkage system 68 is attached to a distal end 72 of the lever 66, wherein linear actuation, i.e., movement, of the lever 66 causes the articulating trim piece to rotate about the rotation axis 64 between the extended position and the retracted position.

The second door 34 includes a seal module 74 configured for sealing an exterior gap between the first exterior panel 48 of the first door 32 and the second exterior panel 52 of the second door 34. The seal module 74 is moveable between a sealing position, shown in FIG. 2, and a withdrawn position, shown in FIG. 3. The seal module 74 is disposed in sealing engagement against the first exterior panel 48 and the second exterior panel 52 when in the sealing position to seal the exterior gap between the first exterior trim panel and the second exterior trim panel.

The seal module 74 is longitudinally spaced along the longitudinal axis 28 from the first door 32 when in the withdrawn position. As such, when in the withdrawn position, a forward end 76 of the seal module 74 is spaced a distance from the rearward edge of the first door 32. The seal module 74 is spaced from the first door 32 when in the withdrawn position to allow independent movement of each of the opposing-hinged doors relative to the other of the opposing-hinged doors. As such, when in the withdrawn position, the first door 32 may be opened and/or closed independently of the second door 34, and the second door 34 may be opened and/or closed independently of the first door 32.

The seal module 74 includes a base. The base may be shaped and/or sized in any suitable manner for the specific design configuration of the vehicle 20. The base may be manufactured from a rigid material, such as but not limited to a metal, from a compliant material, such as but not limited to rubber, or from a combination of rigid and compliant materials.

The linkage system 68 may pivotably interconnect the seal module 74 and the second door 34. The linkage system 68 includes a first swing arm 78 and a second swing arm 80. The linkage system 68 is configured for moving the seal module 74 along an arcuate path between the sealing position and the withdrawn position. Both the first swing arm 78 and the second swing arm 80 rotate simultaneously to move the seal module 74 along the arcuate path. The arcuate path is transverse to the outer surface of the first door 32 and the outer surface of the second door 34. More specifically, the arcuate path is disposed along a generally horizontal plane that is substantially perpendicular to an outer surface of the first door 32 and an outer surface of the second door 34. When moving from the sealing position into the withdrawn position, the arcuate path initially directs the seal module 74 in a substantially transverse direction, away from the outer surface of the first door 32 and the outer surface of the second door 34, and then directs the seal module 74 in a substantially longitudinal direction along the longitudinal axis 28 away from the first door 32. When moving from the withdrawn position into the sealing position, the arcuate path initially directs the seal module 74 in a substantially longitudinal direction along the longitudinal axis 28 toward the first door 32, and then directs the seal module 74 in a substantially transverse direction toward the outer surface of the first door 32 and the outer surface of the second door 34. By moving along the arcuate path, the seal module 74 more directly moves to only compress one or more seals, and minimizes sliding movement across the seals.

The linkage system 68 further includes an articulating trim link 82. As shown in the embodiment of FIGS. 2 through 4, the articulating trim link 82 connects the articulating trim panel 62 and the seal module 74 for movement therewith. However, it should be appreciated that the articulating trim link 82 may not connect the articulating trim panel 62 with the seal module 74, such that the articulating trim may be independently moveable relative to the seal module 74. As shown, the articulating trim link 82 is configured for simultaneously moving the articulating trim panel 62 with the seal module 74. As such, as the seal module 74 moves between the sealing position and the withdrawn position, the articulating trim link 82 moves the articulating trim panel 62 between the extended position and the retracted position respectively. As shown, the articulating trim link 82 interconnects the distal end 72 of the lever 66 and the second swing arm 80 of the linkage system 68, with the articulating trim link 82 being pivotably connected to the lever 66. However, it should be appreciated that the articulating trim link 82 may be connected to other components of the linkage system 68 associated with moving the seal module 74.

The actuator 70 is coupled to the linkage system 68, and is configured for moving the linkage system 68 to thereby move the articulating trim panel 62 and/or the seal module 74. Accordingly, the actuator 70 may move the seal module 74 between the withdrawn position and the sealing position, thereby moving the articulating trim panel 62 between the extended position and the retracted position, or may alternatively be directly connected to the articulating trim panel 62 through the articulating trim link 82 to directly move the articulating trim panel 62 between the extended position and the retracted position. The actuator 70 may include, but is not limited to, an electrically actuated device, such as an electric motor or the like.

Referring to FIG. 4, the articulating trim panel 62 may include a biasing device 84 that is configured for biasing the articulating trim panel 62 into the deployed position. The biasing device 84 may include but is not limited to a torsion spring. Furthermore, the articulating trim panel 62 may also include at least one damper 86 disposed between the articulating trim panel 62 and the second interior trim panel 54. The damper 86 is configured for damping movement between the articulating trim panel 62 and the second interior trim panel 54. The damper 86 may include but is not limited to a rubber bumper or some other similar device. The biasing device 84 biases the articulating trim panel 62 into the extended position such that the bumper is disposed between and dampens movement between the articulating trim panel 62 and the second interior trim panel 54. This arrangement reduces movement, vibration and/or noise from the articulating trim panel 62.

Figure 5:
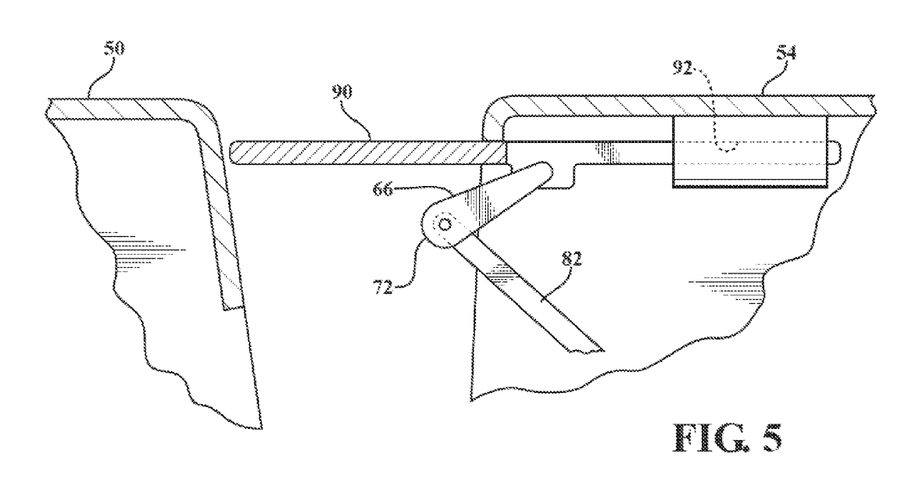
FIG. 5 is a schematic fragmentary cross sectional view of the pair of opposing hinged doors showing a first alternative embodiment of the articulating trim panel.
Figure 6:
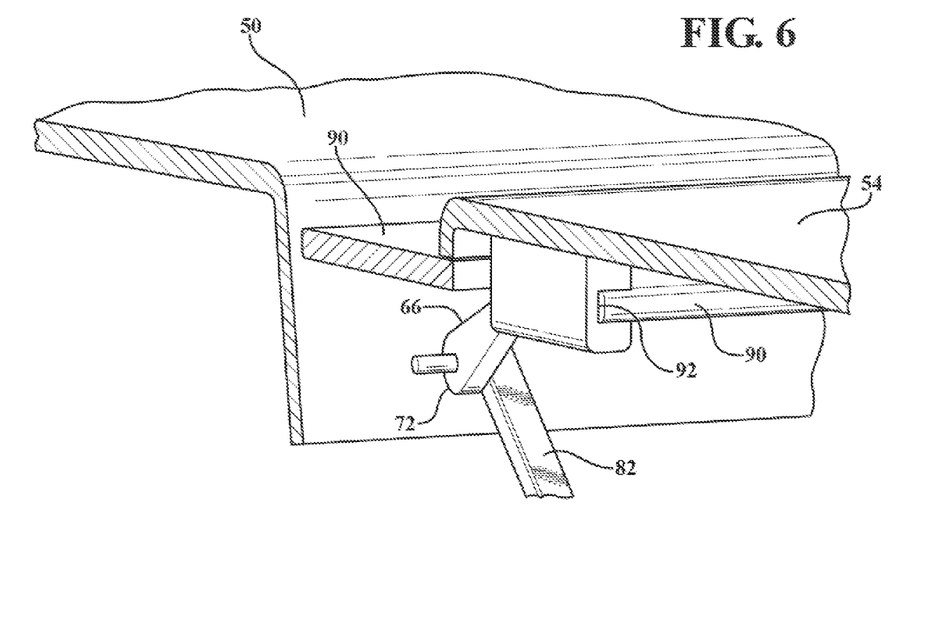
FIG. 6 is a schematic fragmentary perspective view of the pair of opposing hinged doors showing the first alternative embodiment of the articulating trim panel.

Referring to FIGS. 5 and 6, a first alternative embodiment of the articulating trim panel is generally shown at 90. The articulating trim panel 90 is slideably moveable relative to and parallel with the second interior trim panel 54. As shown, the actuator 70 is directly coupled to the articulating trim panel 90 to move the articulating trim panel 90 between the extended position and the retracted position. The second interior trim panel 54 may define a slot 92 for slideably supporting the articulating trim panel 90 relative to the second interior trim panel 54.

Figure 7:
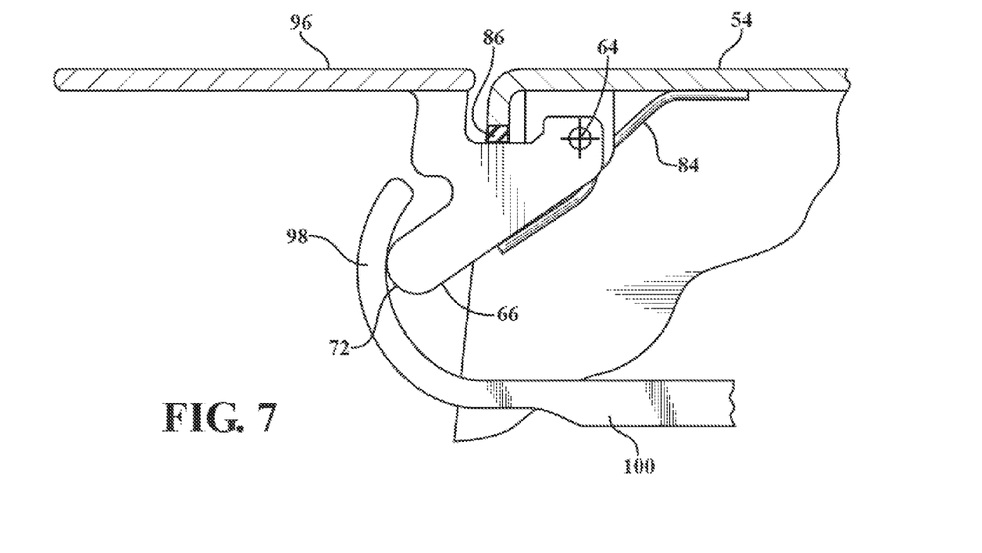
FIG. 7 is a schematic cross sectional view of a second alternative embodiment of the articulating trim panel.

Referring to FIG. 7, a second alternative embodiment of the articulating trim panel is generally shown at 96. The articulating trim panel 96 includes the lever 66 extending from the rotation axis 64 to the distal end 72 of the lever 66 spaced from the rotation axis 64. The distal end 72 of the lever 66 defines a follower, which engages a cam 98 formed into an articulating trim link 100. As such, the cam 98 and the distal end 72 of the lever 66, i.e., the follower, cooperate to define a cam 98 and follower connection between the lever 66 and the articulating trim link 100 of the linkage system 68 to move the articulating trim panel 96 between the extended position and the retracted position. As the articulating trim link 100 moves linearly, the distal end 72 of the lever 66 follows the cam 98, which causes the articulating trim panel 96 to rotate about the rotation axis 64.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
a body;
a pair of opposing hinged doors mounted to the body, the pair of opposing hinged doors including a first door having a first exterior panel and a first interior trim panel spaced from the first exterior panel, and a second door having a second exterior panel and a second interior trim panel spaced from the second exterior panel;
wherein the first door is pivotably moveable relative to the body in a first pivot direction between an open position and a closed position, and wherein the second door is pivotably moveable relative to the body in a second pivot direction between an open position and a closed position, with the second pivot direction opposite the first pivot direction;
wherein the first interior trim panel and the second interior trim panel define an interior gap therebetween; and
an articulating trim panel moveably attached to the second interior trim panel for movement between a deployed position and a retracted position, wherein the articulating trim panel at least partially conceals the interior gap when in the deployed position, and wherein the articulating trim panel is withdrawn from the interior gap when in the retracted position to allow the pivotable movement of the second door relative to the first door.

2. A vehicle as set forth in claim 1 further comprising a biasing device configured for biasing the articulating trim panel into the deployed position.

3. A vehicle as set forth in claim 2 further comprising a damper disposed between the articulating trim panel and the second interior trim panel and configured for damping movement between the articulating trim panel and the second interior trim panel.

4. A vehicle as set forth in claim 1 wherein the second door includes an actuator coupled to the articulating trim panel and configured for moving the articulating trim panel between the deployed position and the retracted position.

5. A vehicle as set forth in claim 4 wherein the actuator includes an electric motor.

6. A vehicle as set forth in claim 4 wherein the second door includes a linkage system interconnecting the actuator and the articulating trim panel.

7. A vehicle as set forth in claim 6 wherein the articulating trim panel is slideably moveable relative to and parallel with the second interior trim panel.

8. A vehicle as set forth in claim 7 wherein the second interior trim panel defines a slot for slideably supporting the articulating trim panel.

9. A vehicle as set forth in claim 4 wherein the articulating trim panel is rotatably moveable about a rotation axis relative to the second interior trim panel.

10. A vehicle as set forth in claim 9 wherein the articulating trim panel includes a lever laterally spaced from and parallel with the rotation axis of the articulating trim panel.

11. A vehicle as set forth in claim 10 wherein the linkage system is attached to a distal end of the lever.

12. A vehicle as set forth in claim 10 further comprising a cam and follower connection between the lever and the linkage system.

13. A vehicle as set forth in claim 11 wherein the second door includes a seal module moveable between a sealing position and a withdrawn position, wherein the seal module is disposed in sealing engagement with the first door and the second door when in the sealing position to seal an exterior gap between the first exterior trim panel and the second exterior trim panel, and wherein the seal module is longitudinally spaced from the first door when in the retracted position to allow independent movement of each of the opposing-hinged doors relative to the other of the opposing-hinged doors.

14. A vehicle as set forth in claim 13 wherein the linkage system pivotably interconnects the seal module and the second door, with the linkage system configured for moving the seal module along an arcuate path, wherein the arcuate path initially directs the seal module away from the first door and the second door, and toward the first interior trim panel and the second interior trim panel, and then directs the seal module along a longitudinal axis away from the first door when moving from the sealing position into the withdrawn position, and wherein the arcuate path initially directs the seal module toward the first door along the longitudinal axis and then directs the seal module toward the first door and the second door and toward the first exterior panel and the second exterior panel when moving from the withdrawn position into the sealing position.

15. A vehicle as set forth in claim 13 wherein the linkage system includes a first swing arm having a first end rotatably coupled to the seal module and a second end rotatably coupled to the second door, and a second swing arm having a first end rotatably coupled to the seal module and a second end rotatably coupled to the second door.

16. A vehicle as set forth in claim 15 wherein the linkage system includes an articulating trim link connecting the articulating trim panel and the seal module and configured for simultaneously moving the articulating trim panel with the seal module.

17. A vehicle as set forth in claim 16 wherein the articulating trim link interconnects the lever of the articulating trim panel and the second swing arm.

18. A vehicle as set forth in claim 16 wherein the articulating trim link is pivotably connected to the lever.

19. A pair of opposing hinged doors for a vehicle, the pair of opposing hinged doors comprising:
- a first door having a first exterior panel and a first interior trim panel spaced from the first exterior panel, and a second door having a second exterior panel and a second interior trim panel spaced from the second exterior panel;
- wherein the first door is configured for pivotable movement relative to a body of the vehicle in a first pivot direction between an open position and a closed position, and wherein the second door is configured for pivotable movement relative to the body in a second pivot direction between an open position and a closed position, with the second pivot direction opposite the first pivot direction;
- wherein the first interior trim panel and the second interior trim panel define an interior gap therebetween;
- an articulating trim panel moveably attached to the second interior trim panel for movement between a deployed position and a retracted position, wherein the articulating trim panel at least partially conceals the interior gap when in the deployed position, and wherein the articulating trim panel is withdrawn from the interior gap when in the retracted position to allow the pivotable movement of the second door relative to the first door;
- wherein the articulating trim panel is rotatably moveable about a rotation axis relative to the second interior trim panel;
- a biasing device configured for biasing the articulating trim panel into the deployed position;
- a damper disposed between the articulating trim panel and the second interior trim panel and configured for damping movement between the articulating trim panel and the second interior trim panel;
- wherein the second door includes an actuator coupled to the articulating trim panel and configured for moving the articulating trim panel between the deployed position and the retracted position;
- wherein the second door includes a linkage system interconnecting the actuator and the articulating trim panel;
- wherein the second door includes a seal module moveable between a sealing position and a withdrawn position, wherein the seal module is disposed in sealing engagement with the first door and the second door when in the sealing position to seal an exterior gap between the first exterior trim panel and the second exterior trim panel, and wherein the seal module is longitudinally spaced from the first door when in the retracted position to allow independent movement of each of the first door and the second door relative to each other;
- wherein the linkage system pivotably interconnects the seal module and the second door, with the linkage system configured for moving the seal module along an arcuate path, wherein the arcuate path initially directs the seal module away from the first door and the second door, and toward the first interior trim panel and the second interior trim panel, and then directs the seal module along a longitudinal axis away from the first door when moving from the sealing position into the withdrawn position, and wherein the arcuate path initially directs the seal module toward the first door along the longitudinal axis and then directs the seal module toward the first exterior panel and the second exterior panel when moving from the withdrawn position into the sealing position; and
- wherein the linkage system includes an articulating trim link connecting the articulating trim panel and the seal module and configured for simultaneously moving the articulating trim panel with the seal module.

* * * * *